(12) United States Patent
Nilsson

(10) Patent No.: US 12,421,740 B2
(45) Date of Patent: Sep. 23, 2025

(54) BUILDING PANEL COMPRISING MINERAL-BASED LAYER

(71) Applicant: Välinge Innovation AB, Viken (SE)

(72) Inventor: Christoffer Nilsson, Helsingborg (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

(21) Appl. No.: 17/480,592

(22) Filed: Sep. 21, 2021

(65) Prior Publication Data

US 2022/0090391 A1 Mar. 24, 2022

(30) Foreign Application Priority Data

Sep. 23, 2020 (SE) .................... 20511028

(51) Int. Cl.
*E04F 15/10* (2006.01)
*B32B 7/12* (2006.01)
(Continued)

(52) U.S. Cl.
CPC .............. *E04F 15/107* (2013.01); *B32B 7/12* (2013.01); *B32B 13/12* (2013.01);
(Continued)

(58) Field of Classification Search
CPC . E04F 15/107; E04F 15/02038; E04F 15/105; E04F 2201/0153; E04F 2201/023; E04F 2201/043; E04F 13/0894; E04F 13/18; E04F 2201/0138; E04F 2201/0535; E04F 2201/0547; B32B 7/12; B32B 13/12; B32B 2250/03; B32B 2250/40; B32B 2307/558; B32B 2419/04; B32B 2262/067; B32B 2270/00; B32B 3/06; B32B 9/045;
(Continued)

(56) References Cited

U.S. PATENT DOCUMENTS 3,753,936 A * 8/1973 Marrs .................... C09J 153/02
 524/432
10,696,595 B2 * 6/2020 Wambaugh ........... C04B 18/248
(Continued)

FOREIGN PATENT DOCUMENTS

CA 3066152 A1 * 6/2020 ............. B32B 13/02
CN 110644704 B 6/2020
(Continued)

OTHER PUBLICATIONS

U.S. Appl. No. 17/318,232, Christian Boo, filed May 12, 2021, (Cited herein as US Patent Application No. 2021/0355688 A1 of Nov. 18, 2021).
(Continued)

*Primary Examiner* — Brent W Herring
(74) *Attorney, Agent, or Firm* — Boone IP Law

(57) ABSTRACT

A building panel, such as floor panel, including a core, the panel further including an upper arrangement being attached to an upper side of the core and/or a lower arrangement being attached to a lower side of the core. At least one of the core, the upper arrangement and lower arrangement is mineral-based, and at least one of upper and/or lower arrangement includes at least one rigid layer. The rigid layer includes at least one of an impact modifier or an acrylic processing aid.

20 Claims, 3 Drawing Sheets

(51) Int. Cl.
  *B32B 13/12* (2006.01)
  *E04F 15/02* (2006.01)
(52) U.S. Cl.
  CPC ...... *E04F 15/02038* (2013.01); *E04F 15/105* (2013.01); *B32B 2250/03* (2013.01); *B32B 2250/40* (2013.01); *B32B 2307/558* (2013.01); *B32B 2419/04* (2013.01); *E04F 2201/0153* (2013.01); *E04F 2201/023* (2013.01); *E04F 2201/043* (2013.01)
(58) Field of Classification Search
  CPC ..... B32B 27/20; B32B 27/304; B32B 27/302; B32B 27/308; B32B 27/322; B32B 2255/26; B32B 2262/062; B32B 2262/106; B32B 2607/00
  USPC ............ 52/578, 588.1, 589.1, 309.16, 309.1, 52/309.15
  See application file for complete search history.

(56) References Cited

U.S. PATENT DOCUMENTS

| | | | |
|---|---|---|---|
| 11,053,696 B1* | 7/2021 | Baert | E04B 1/99 |
| 2009/0241450 A1 | 10/2009 | Italiane et al. | |
| 2013/0004703 A1 | 1/2013 | Kwon et al. | |
| 2014/0272404 A1* | 9/2014 | Shake | B32B 13/12 |
| | | | 428/221 |
| 2015/0024168 A1 | 1/2015 | Son | |
| 2016/0083965 A1* | 3/2016 | Baert | B29C 65/4805 |
| | | | 52/309.1 |
| 2016/0153187 A1* | 6/2016 | Desai | B32B 27/28 |
| | | | 428/497 |
| 2016/0264461 A1* | 9/2016 | Peng | D06N 3/0063 |
| 2017/0044778 A1* | 2/2017 | Brickner | B32B 27/304 |
| 2018/0171631 A1 | 6/2018 | Klug et al. | |
| 2019/0040635 A1* | 2/2019 | Baert | B32B 37/153 |
| 2019/0085569 A1* | 3/2019 | Ryberg | B44C 5/04 |
| 2020/0308846 A1* | 10/2020 | Josefsson | E04F 13/0866 |
| 2021/0148121 A1* | 5/2021 | Boquillon | B32B 27/20 |
| 2021/0238862 A1* | 8/2021 | Baert | E04F 13/0894 |
| 2021/0355688 A1 | 11/2021 | Boo | |
| 2021/0363759 A1* | 11/2021 | Baert | B32B 21/14 |
| 2021/0372143 A1* | 12/2021 | Baert | E04F 15/08 |
| 2021/0387436 A1 | 12/2021 | Nilsson et al. | |
| 2021/0388623 A1 | 12/2021 | Nilsson et al. | |

FOREIGN PATENT DOCUMENTS

| | | | | |
|---|---|---|---|---|
| DE | 28 101 80 A1 | 9/1979 | | |
| WO | WO 2017/027155 A1 | 2/2017 | | |
| WO | WO 2017/121389 A1 | 7/2017 | | |
| WO | 2019/101928 A1 | 5/2019 | | |
| WO | WO 2019/197393 A1 | 10/2019 | | |
| WO | WO-2020114642 A1 * | 6/2020 | ............ | B32B 17/02 |
| WO | 2021/251894 A1 | 12/2021 | | |
| WO | 2022/096712 A1 | 5/2022 | | |

OTHER PUBLICATIONS

U.S. Appl. No. 17/345,586, Christoffer Nilsson, Per Josefsson, Christian Boo, filed Jun. 11, 2021, (Cited herein as US Patent Application No. 2021/0388623 A1 of Dec. 16, 2021).
U.S. Appl. No. 17/345,420, Christoffer Nilsson, Per Josefsson, Christian Boo, filed Jun. 11, 2021, (Cited herein as US Patent Application No. 2021/0387436 A1 of Dec. 16, 2021).
Office Action and Search Report mailed May 14, 2021 in SE Patent Application No. 2051102-8, PRV, Stockholm, SE, 9 pages.
International Search Report and Written Opinion mailed Nov. 16, 2021 in PCT/SE2021/050914, ISA/SE, Patent-och registreringsverket, Stockholm, SE, 11 pages.
U.S. Appl. No. 18/734,643, Christoffer Nilsson, filed Jun. 5, 2024.
U.S. Appl. No. 18/367,071, Christoffer Nilsson, filed Sep. 12, 2023.
U.S. Appl. No. 18/383,273, Christian Boo, filed Oct. 24, 2023.
U.S. Appl. No. 18/628,988, Per Josefsson, filed Apr. 8, 2024.
Extended European Search Report and Search Opinion received for EP Application No. 21873061, mailed on Sep. 12, 2024, 10 pages.
Supplementary European Search Report and Search Opinion received for EP Application No. 21803832, mailed on Apr. 25, 2024, 8 pages.

* cited by examiner

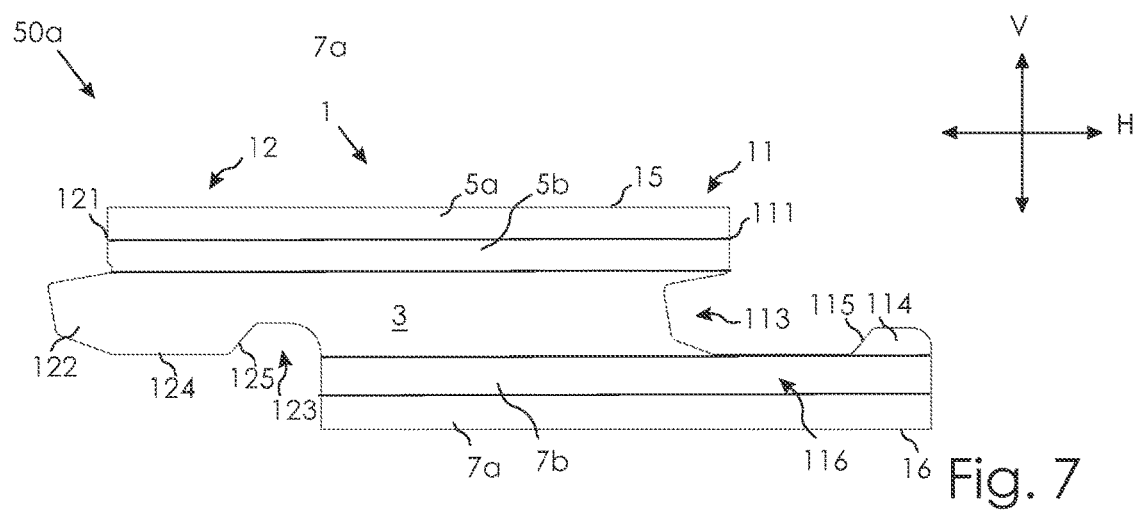
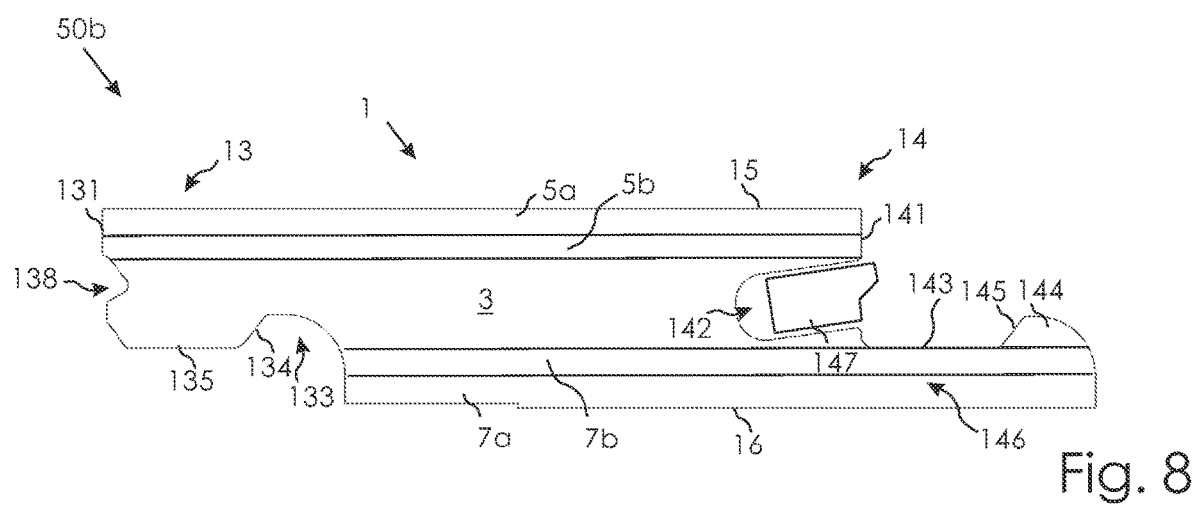

BUILDING PANEL COMPRISING MINERAL-BASED LAYER

CROSS REFERENCE TO RELATED APPLICATIONS

The present application claims the benefit of Swedish Application No. 2051102-8, filed on Sep. 23, 2021. The entire contents of Swedish Application No. 2051102-8 are hereby incorporated herein by reference in their entirety.

TECHNICAL FIELD

The disclosure generally relates to a mineral-based panel. More specifically, the disclosure relates to a panel comprising a mineral-based layer, such as a mineral-based core. The panel may comprise a locking system on at least one edge portion of the panel, preferably on two opposite edge portions of the panel. The disclosure also relates to a locking system in a mineral-based panel comprising a mineral-based core or mineral-based core layer.

BACKGROUND

There is an increased demand for boards, such as floorboards, that are sustainable and in particular recyclable. There is also a need for fire resistant and water resistant boards, especially those that may maintain or even improve the properties that typically are associated with the boards, such as their dimensional stability under temperature variations of the ambient temperature and/or under moisture variations and, optionally, their flexibility.

Examples of such boards are magnesium oxide boards and cement boards or fibre cement boards. For example, a magnesium oxide board may have a layer structure attached thereto, such as comprising HPL panel.

However, such boards are still typically relatively brittle and there is need for improvements. Moreover, there is need for more robust locking systems for such, and similar, boards.

SUMMARY

It is therefore an object of at least embodiments of the disclosure is to mitigate or at least to some extent alleviate the drawbacks of mineral-based panels.

Another object of at least embodiments of the present inventive concept is to facilitate a stronger locking system for a mineral-based panel.

Another object of at least embodiments of the present inventive concept is to improve durability of the locking system for a mineral-based panel.

At least some of these and other objects and advantages that will be apparent from the description have been achieved by the various aspects described below.

In accordance with a first aspect of the inventive concept, there is provided a building panel, such as floor panel, comprising a core and the panel further comprising an upper arrangement being attached to an upper side of the core and/or a lower arrangement being attached to a lower side of the core. At least one of the core, the upper arrangement or lower arrangement may be mineral-based layer. For example, the core may constitute a mineral-based layer, such as the entirely of the core. For example, one or both of the upper arrangement layer and the lower arrangement may comprise a mineral-based attachment layer. Preferably, the core is mineral-based. At least one of upper and/or lower arrangement comprises at least one rigid layer. The rigid layer preferably comprises at least one of an impact modifier or an acrylic processing aid.

A mineral-based layer, such as a mineral-based attachment layer or a mineral-based core, preferably comprises at least 20 wt %, preferably at least 30 wt %, of a mineral material, such as non-hydraulic cement, preferably magnesium oxide, and optionally magnesium chloride ($MgCl_2$) and/or magnesium sulphate ($MgSO_4$).

In one embodiment, the rigid layer is a non-plasticized layer and/or is essentially free from plasticizer.

The impact modifier and acrylic processing aid, combined, may be present in an amount of 0.5 to 10 wt %, preferably 2 to 5 wt % of the rigid layer.

In one embodiment, the impact modifier comprises Chlorinated Polyethylene (CPE), Acrylic copolymer (ACR), Methylmethacrylate-butadiene-styrene copolymer (MBS), Acrylonitrile-butadiene-styrene copolymer (ABS), Ethylene/vinyl acetate/carbon monoxide (E/VA/CO) or combinations thereof.

The amount of impact modifier may be in the range of 0.5 to 10 wt %, preferably 2 to 5 wt %, of the rigid layer.

In one embodiment, the acrylic processing aid comprises Acrylic copolymers (ACR), such as Methyl Acrylate, Methyl Methacrylate, Ethyl Acrylate, Ethyl Methacrylate, Butyl Acrylate, Butyl Methacrylate or Styrene.

The amount of ACR may be in the range of 0.5 to 10 wt %, preferably 2 to 5 wt %, of the rigid layer.

In one embodiment, the rigid layer comprises one or more of a thermoplastic polymer, such as PVC.

The thermoplastic polymer may be present in an amount of 15-60 wt %, preferably 17-30 wt % of the rigid layer.

In one embodiment, the rigid layer further comprises one or more of a filler, such as CaCO3, a pigment, such as carbon black, a stabilizer, such as CaZn, and a lubricant.

The upper and/or lower arrangement may comprise a mineral-based attachment layer. The rigid layer is preferably attached to said mineral-based attachment layer.

The rigid layer may be attached to the mineral-based attachment layer or to the mineral-based core by means of an adhesive. The adhesive may be compatible with the materials of the attached layers.

In any of the embodiments and examples herein, the adhesive attaching a rigid layer to a mineral-based attachment layer or to a mineral-based core, may be a polyurethane, silane-terminated epoxy resin, or silane-terminated polyurethane. Any of these may be two-component. Moreover, the adhesive may be a non-reactive or reactive hot-melt adhesive, for example being based on polyurethane or polyolefin. More generally, the adhesive may be a two-component adhesive. Preferably, the adhesive is moisture resistant and/or heat resistant.

In one embodiment, the core is mineral-based, such as an entirety of the core; preferably, the rigid layer(s) is attached to the core. A mineral-based core may include additional layers, such as a fibre layer, such as a glass-fibre layer. The additional layers may be on either or both sides of the core. The additional layers may be located within the core, i.e. in between the sides of the core.

The mineral-based attachment layer and/or the mineral-based core may comprise MgO, preferably in an amount of at least 20 wt %, such as at least 30 wt %.

The mineral-based attachment layer or mineral-based core may comprise non-hydraulic cement. The non-hydraulic cement may comprise magnesium oxide, and optionally magnesium chloride (e.g. $MgCl_2$) and/or magnesium sulphate (e.g. $MgSO_4$). For example, the non-hydraulic cement may comprise or may be Sorel cement.

The mineral-based attachment layer or mineral-based core may comprise hydraulic cement. The hydraulic cement may comprise silicates, such as calcium silicates, and optionally oxides. For example, the cement may be fibre cement, such as comprising or being Portland cement.

The mineral-based attachment layer or mineral-based core may comprise magnesium oxide and, optionally, magnesium chloride and/or magnesium sulphate.

The mineral-based attachment layer or mineral-based core may comprise gypsum or may be a gypsum board. This may be particularly advantageous for a wall panel or a ceiling panel.

The mineral-based attachment layer or mineral-based core may comprise an inorganic matrix material. For example, the inorganic matrix material may comprise magnesium oxide, cement, such as hydraulic or non-hydraulic cement, or gypsum, preferably in an amount of at least 20 wt %, such as at least 30 wt %.

Generally, the mineral-based attachment layer or mineral-based core may further comprise at least one selected from the group of a filler, such as an organic and/or inorganic filler, additive(s) and a binding agent. The filler may be a functional filler. For example, the functional filler may reinforce the core, improve the bonding to a, preferably inorganic, matrix material of the core, increase a rigidity of the core, etc.

The mineral-based attachment layer or mineral-based core may comprise organic material, such as at least one selected from the group of wood fibres, cellulose fibres, natural fibres, carbon fibres, and bamboo.

The mineral-based attachment layer or mineral-based core may comprise inorganic material, such as calcium carbonate, fly ash, silica, or perlite.

In a preferred embodiment, the panel comprises mechanical locking systems at respective opposite first and second edges, such as long edges and respective opposite third and fourth edges, such as short edges, for assembling a first panel in an assembled position with an adjacent second panel by means of a folding displacement and/or a vertical displacement. Immediately juxtaposed upper edge portions of the first edge of the first panel and the second edge of the second panel in the assembled position form a vertical plane. The first edge comprises a locking strip projecting beyond the vertical plane and a locking element projecting from the locking strip. The second edge comprises a downwards open locking groove configured to receive the locking element by means of the folding or vertical displacement to for horizontal locking of adjacent panels from parting away from each other.

A first pair of horizontal locking surfaces, i.e. locking surfaces for horizontal locking, comprises a first locking surface provided by the locking element and a second locking surface provided by the locking groove.

Known locking systems commonly feature biased horizontal locking; one or more members of the locking system is resilient or is able to flex or be compressed. Thereby, horizontal locking surfaces are allowed to overlap during assembling, such as during assembling by means of a folding displacement, virtually without risk of breaking the lock.

Known panels may also have a horizontal play in a horizontal locking position, however during assembling it functions by one or more members are able to flex or be compressed, this is necessary because the locking surfaces overlap/abut during assembling.

In a mineral-based panel however, one or more members of the locking system may essentially not be able to flex or be compressed, as described above, and thus there is a risk of breaking the lock such as during assembling. For example, the locking strip may be formed in a mineral-based attachment layer or mineral-based core, whereby the locking strip easily breaks during assembling, in particular if the locking surfaces are overlapping during assembling, as described above.

In one embodiment, one of the first or second edge, and optionally also one of the third or fourth edge comprises a locking tongue and the other of the first or second edge, and optionally also the other of the third or fourth edge comprises a tongue groove. The locking systems are configured such that the locking tongue is received in the tongue groove of by means of a folding displacement and/or a vertical displacement, such as a linear vertical translation, of the panel or an adjacent second panel, for vertical locking of the first edge of a first panel and the second edge of an adjacent second panel, or vertical locking of the third edge of the first panel and the fourth edge of an adjacent second panel respectively.

In one embodiment, a locking angle is formed between a first locking surface, provided by the locking element, and a back surface of the panel, the locking angle preferably measured as the smaller angle in a clockwise direction from the plane of the first locking surface to the back surface, hence in a cross-sectional view wherein the locking strip extends rightwards. The locking angle being in the range of 40 to 60 degrees, preferably 45 to 55 degrees, more preferably 48 to 52 degrees, such as 50 degrees.

The locking angle may be adapted to allow said folding displacement without abutment of the first locking surface and the second locking surface.

In one embodiment, the locking angle LA is adapted to allow assembling by means of said folding displacement F without flexing or compression of the locking strip.

The locking angle may be adapted to allow assembling by means of said folding displacement without flexing or compression of the locking element.

In one embodiment, the locking angle is configured such that it is sufficiently low to allow assembling by means of a folding displacement without overlapping of the second pair of horizontal locking surfaces while the first pair of horizontal locking surfaces are simultaneously in contact.

In one embodiment, the locking strip is formed at least partially in the rigid layer comprising at least one of an impact modifier or an acrylic processing aid. In particular, at least a portion of the locking strip may preferably be formed in the said rigid layer.

The locking element may be formed as an integral part of the locking strip.

The locking element may be formed at least partially in a rigid layer.

In one embodiment, at least one of the mineral-based core and the mineral-based attachment layer comprises non-hydraulic cement, preferably magnesium oxide, and optionally magnesium chloride ($MgCl_2$) and/or magnesium sulphate ($MgSO_4$).

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which

FIG. 7 illustrates an embodiment of a panel in a cross-sectional view.

FIG. 8 illustrates an embodiment of a panel in a cross-sectional view.

DETAILED DESCRIPTION

Figure 1:
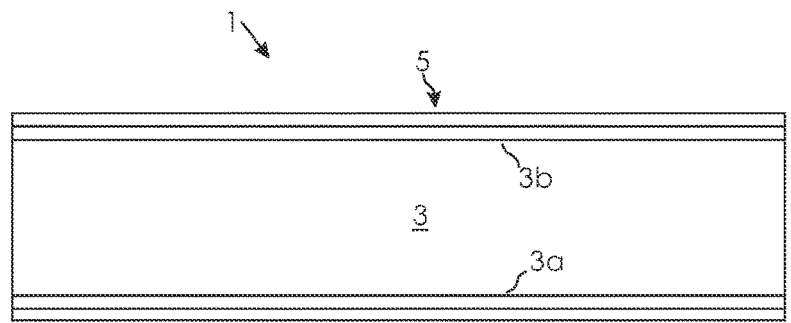
FIG. 1 illustrates an embodiment of a panel in a cross-sectional view.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Polymers include thermoplastic and thermosetting. Thermoplastic polymers include PVC, PET, PP. Thermosetting polymers include a melamine-formaldehyde resin, epoxy resin, preferably crosslinked with an amine hardener, PU, polyurea or acrylate polymers. The rigid layer preferably comprises thermoplastic polymers.

Typically, rigid thermoplastic layers contain a plasticizer. A plasticizer is a substance that is added to a material, for example, to make it softer and more flexible, to increase its plasticity, to decrease its viscosity, or to decrease friction during its handling in manufacture.

Mineral-based layers are typically brittle. Consequently, a mechanical locking system formed in a mineral-based layer, such as a mineral-based attachment layer or a mineral-based core, of a building panel may thus be brittle and break easily. It would thus be desirable to provide stronger locking system in a panel comprising a mineral-based layer. According to embodiments of the disclosure, the mechanical locking system is at least partially formed in a rigid layer of an upper and/or lower arrangement of the panel. In preferred embodiments, the rigid layer comprises a thermoplastic, such as PVC, which is non-plasticized and/or the rigid layer may preferably be completely or essentially free from plasticizer, such as less than 0.3 wt % of plasticizer. Such plasticizers may be e.g. DOTP Dioctyl terephthalate, DEHP-di(2-ethylhexyl) phthalate, DINP—Diisononyl phthalate, DINCH-1,2-Cyclohexane dicarboxylic acid diisononyl ester or DEHT—Dioctyl terephthalate.

According to the aspects of the disclosure, an impact modifier or acrylic processing aid is added in a rigid so-called A-layer, i.e., a layer of the upper arrangement or lower arrangement. The impact modifier may provide a softer and more flexible A-layer compared to rigid thermoplastic, such as PVC without the additive, but will have a higher toughness compared to the traditional plasticized A-layer. These properties are very beneficial for the locking system formed at least partially in the A-layer and which should be tough in order to withstand mechanical forces.

The additives used can be impact modifiers such as CPE (chlorinated polyethylene), ACR (acrylic copolymer), MBS (methylmethacrylate-butadiene-styrene copolymer, ABS (acrylonitrile-butadiene-styrene copolymer), E/VA/CO (ethylene/vinyl acetate/carbon monoxide) or combinations thereof. The said additives should preferably be added in a high amount for example 20 parts per hundred resins (PHR). The additives could also be processing aids such as ACR (acrylic copolymers) as will be further elucidated herein. ACR may function both as an impact modifier and as a processing aid.

The impact modifier may comprise a core shell; preferably, the core shell is compatible with at least one of PVC, PET or PP. For example, the core shell may be compatible by being able to bind with at least one of PVC, PET or PP. The impact modifier may bind to PVC, PET or PP by means of hydrophilic properties. Thus, in one embodiment the core shell of the impact modifier may exhibit hydrophilic properties. Thus, an outer surface of the impact modifier may exhibit hydrophilic properties.

A processing aid may be a compound that alters certain properties of the thermoplastic. For example, a processing aid may increase viscosity of a thermoplastic, or, for example, decrease the thermoplastic's propensity to adhere, such as to a mold, during extrusion. In a further example, a processing aid may increase the melt strength of a thermoplastic.

A commercial LVT product consists of multiple layers with different compositions depending on function. On an MgO product there is often an LVT-layer (plasticized PVC layer) glued on the MgO board. These LVT layers are often plasticized to make them softer and flexible. A typical composition of these plasticized layers can be e.g. DOTP Dioctyl terephthalate, DEHP-di(2-ethylhexyl) phthalate, DINP—Diisononyl phthalate, DINCH-1,2-Cyclohexane dicarboxylic acid diisononyl ester or DEHT—Dioctyl terephthalate.

Referring to FIG. 1-FIG. 8, a building panel 1, such as floor panel, is shown. The panel comprising a core 3 and an upper arrangement 5 comprising at least one upper layer being attached to an upper side 3b of the core. The upper arrangement may comprise a mineral-based attachment layer 5b. Alternatively or additionally, the core 3 may constitute a mineral-based layer. At least one of the upper layer(s) of the upper arrangement 5 comprises at least one rigid layer 5a comprising a polymer, in particular a thermoplastic polymer, henceforth referred to as rigid layer. The rigid layer is preferably a non-plasticized layer, more preferably non-plasticized polymer. The polymer may be thermoplastic, such as PVC, PET, PP, preferably PVC.

The building panel may further comprise a lower arrangement 7 comprising at least one lower rigid layer 7a being attached to a lower side 3a of the core 3.

At least one of said lower layers may be a rigid layer 5a, 7a as described herein, such as a non-plasticized layer.

The rigid layer 5a, 7a may comprise at least one of an impact modifier and/or acrylic processing aid.

An aggregate amount, such as a total amount, of impact modifier and acrylic processing aid may be present in an amount of 0.5 to 10 wt %, preferably 2 to 5 wt % of the rigid layer.

The impact modifier may comprise CPE (Chlorinated Polyethylene), ACR (Acrylic copolymer), MBS (methylmethacrylate-butadiene-styrene copolymer, ABS (acrylonitrile-butadiene-styrene copolymer), E/VA/CO (ethylene/vinyl acetate/carbon monoxide), or combinations thereof.

The amount of impact modifier may be in the range of 0.5 to 10 wt %, preferably 2 to 5 wt %.

The acrylic processing aid may comprise Acrylic copolymers (ACR).

The amount of ACR may be in the range of 0.5 to 10 wt %, preferably 2 to 5 wt %.

The rigid layer 5a 7a may be essentially free from plasticizer, such as e.g. DOTP Dioctyl terephthalate, DEHP-di(2-ethylhexyl) phthalate, DINP-Diisononyl phthalate, DINCH-1,2-Cyclohexane dicarboxylic acid diisononyl ester or DEHT-Dioctyl terephthalate.

The rigid layer may comprise one or more of a thermoplastic polymer, such as PVC, a filler, such as CaCO3 or talc, a pigment, such as carbon black, titanium dioxide, or any other desirable pigment, a stabilizer such as CaZn, BaZn, ESBO (Epoxidized soybean oil) or Organo-SN Stabilizers and a lubricant, such as PE waxes, Oxidized-PE waxes, Paraffin waxes or Ester Waxes.

In one exemplary embodiment, one or more of the rigid layer(s) 5a, 7a, preferably both rigid layers 5a, 7a comprises a thermoplastic polymer in the form of PVC in the amount of 15-60 wt %, preferably 17-30 wt %, a filler in form of CaCO3 in the amount of 80-50 wt %, preferably 60-80 wt %, an optional pigment such as carbon black in the amount of 0.1-0.5 wt %, preferably 0.1-0.3 wt %, a stabilizer in the form of CaZn in the amount of 1-5 wt %, preferably 1.5-3 wt %, a first lubricant in the amount of 0.1-0.5 wt %, preferably 0.1-0.3 wt %, an optional second lubricant in the amount of 0.1-1, preferably 0.1-0.3 wt % and one or more impact modifiers selected from the impact modifiers mentioned herein, in the amount 0.5-10 wt %, preferably 2-5 wt %. The amount of plasticizer is preferably 0 wt %.

As derivable from FIG. 1-FIG. 8, the various configurations or the rigid layers(s) is possible. A main advantage of providing a rigid layer 5a, 7a is to improve the strength and durability of the locking system(s) of the panel 1. Thus, the configuration and thickness of the layer(s) may be adapted depending on the locking system and the desired properties of the panel 1.

Figure 2:
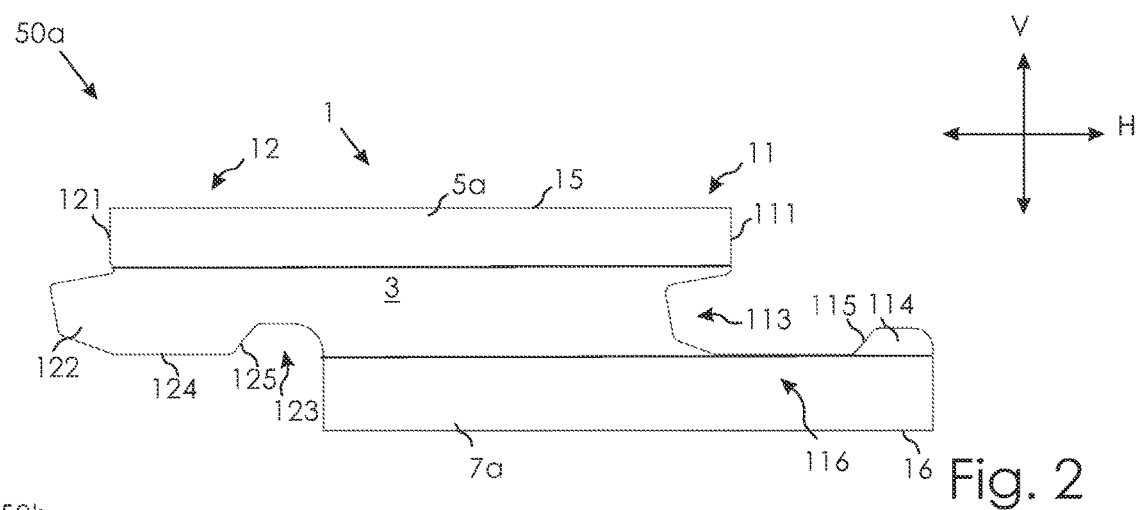
FIG. 2 illustrates an embodiment of a panel in a cross-sectional view.
Figure 3:
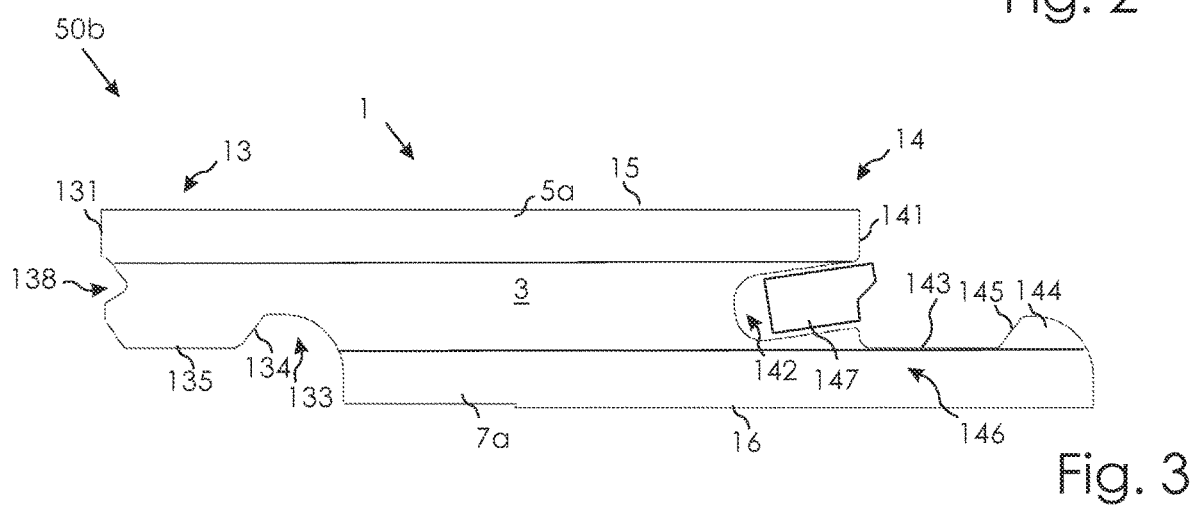
FIG. 3 illustrates an embodiment of a panel in a cross-sectional view.

In one example, shown in FIG. 2 and FIG. 3, the core 3 is mineral-based and the panel comprises an upper rigid layer 5a and a lower rigid layer 7a.

Although FIG. 1-FIG. 8 respectively show an upper rigid layer 5a and a lower rigid layer 7a, it should be appreciated that the panel 1 may comprise, in addition to the core, only the upper rigid layer 5a or only the lower rigid layer 7a.

Figure 5:
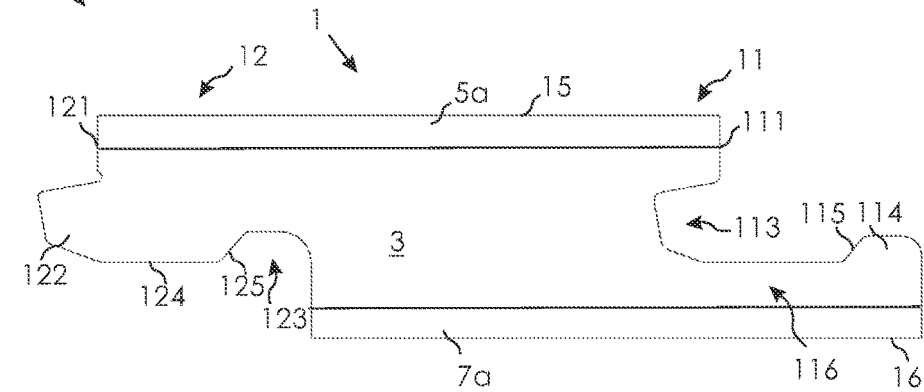
FIG. 5 illustrates an embodiment of a panel in a cross-sectional view.
Figure 6:
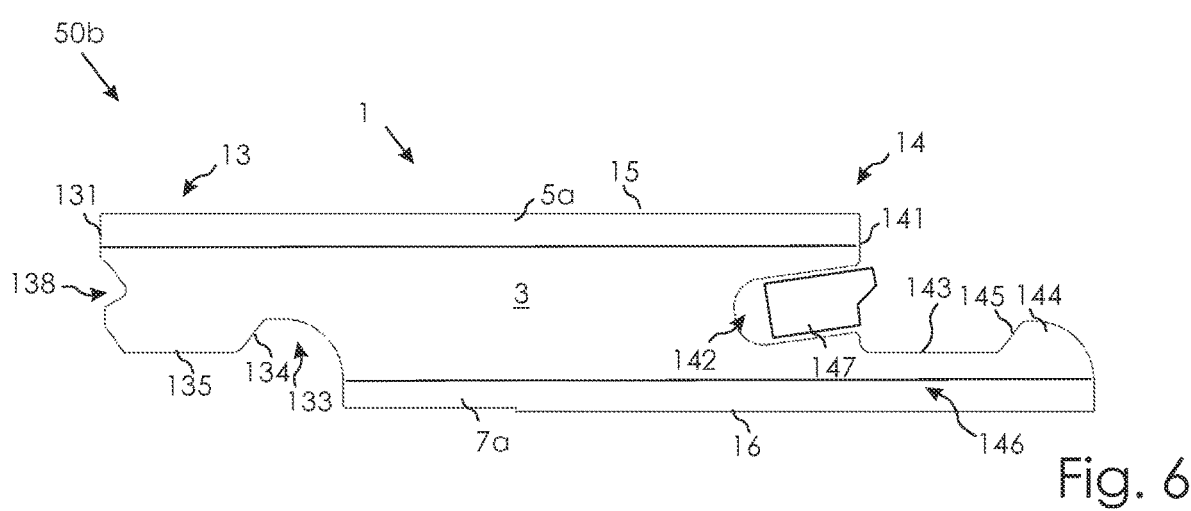
FIG. 6 illustrates an embodiment of a panel in a cross-sectional view.

The thickness one rigid layer may also vary depending for example on the desired properties of the panel. In a non-limiting example, the thickness of the respective rigid layers may be in the range of 5-30% of the total panel thickness as schematically illustrated in FIG. 2 and FIG. 3. In another non-limiting example, the thickness of the respective rigid layers may be in the range of 5-15% of the total panel thickness as schematically illustrated in FIG. 5 and FIG. 6. In a further non-limiting example schematically illustrated in FIG. 7 and FIG. 8, the upper arrangement 5 comprises a mineral-based layer 5b. Alternatively or additionally, the lower arrangement 7 comprises a mineral-based layer 7b. Rigid layers 5a and/or 7a may be attached to the mineral-based layers 5b, 7b respectively.

Figure 4:
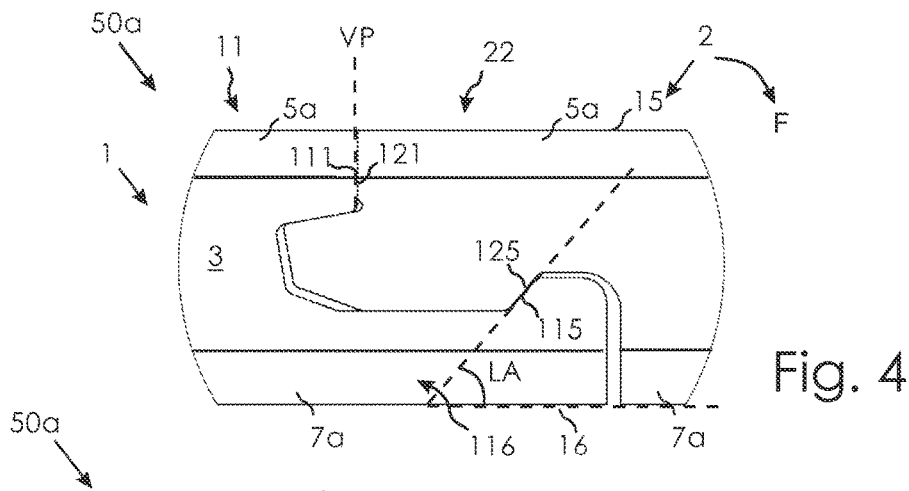
FIG. 4 is a cross-sectional illustration of details of two assembled panels according to an embodiment.

Referring to FIG. 2, FIG. 5 and FIG. 7 the panel 1 comprises a first mechanical locking system 50a at respective opposite first 11 and second 12 edges, such as long edges, for assembling a first panel 1 in an assembled position with an adjacent second panel 2 by means of a folding displacement F, as shown in FIG. 4. Immediately juxtaposed upper edge portions 111, 121 of the first edge 11 of the first panel 1 and the second edge 22 of the second panel 2 in the assembled position form a vertical plane VP. The mechanical locking system 50a may be formed at least partially in at least one of the rigid layers 5a, 7a described herein. The upper edge portions 111, 121 may be formed at least partially in a rigid layer 5a according to the inventive concept.

The first edge 11 comprises a locking strip 116 projecting beyond the vertical plane VP and a locking element 114 projecting from the locking strip 116. The second edge 12 comprises a downwards open locking groove 123 configured to receive the locking element by means of the displacement F for horizontal locking of the adjacent panels. A first pair of horizontal locking surfaces comprises a first locking surface 115 provided by the locking element 114 and a second locking surface 125 provided by the locking groove 123. The locking strip 116 may be formed at least partially in a rigid layer 7a according to the inventive concept.

Referring to FIG. 3, FIG. 6 and FIG. 8, the panel preferably comprises a second mechanical locking system 50b at respective opposite third 13 and fourth 14 edges, such as short edges, for assembling a first panel 1 in an assembled position with an adjacent second panel (not shown) by means of a folding displacement F and/or a vertical displacement V. In order to facilitate assembling by means of vertical displacement, the fourth edge 14 may comprise a displaceable tongue 147, such as a flexible tongue, which is configured to displace in a displacement groove 142 provided in the fourth edge 14 in response to a lower portion of the third edge 13 of an adjacent panel pushing the displaceable tongue 147 in an unlocking direction into the displacement groove 142, and thereafter flex back in a locking direction and cooperate with a tongue groove 138 of the third edge 13 of the adjacent panel, for vertical locking of the panels.

Immediately juxtaposed upper edge portions 131, 141 of the third edge 13 of the first panel 1 and the third edge of a second panel 2 in the assembled position form a vertical plane VP.

The fourth edge 14 comprises a locking strip 146 projecting beyond the vertical plane VP and a locking element 144 projecting from the locking strip 146. The third edge 13 comprises a downwards open locking groove 133 configured to receive the locking element by means of the vertical V or folding displacement F for horizontal locking of the adjacent panels. A first pair of horizontal locking surfaces comprises a first locking surface 145 provided by the locking element 144 and a second locking surface 134 provided by the locking groove 133. The mechanical locking system 50a may be formed at least partially in at least one of the rigid layers 5a, 7a described herein. The upper edge portions 131, 141 may be formed at least partially in the upper rigid layer 5a. The locking strip 146 may be formed at least partially in a rigid layer 7a according to the inventive concept.

Known locking systems commonly feature biased horizontal locking; one or more members of the locking system is resilient or is able to flex or be compressed. Thereby, horizontal locking surfaces are allowed to overlap during assembling virtually without risk of breaking the lock.

Known panels may also have a horizontal play in a horizontal locking position, however during assembling it functions by one or more members are able to flex or be compressed, this is necessary because the locking surfaces overlap/abut during assembling.

In a preferred embodiment, one of the first or second edge 11, 12 comprises a locking tongue 122, 118 and the other of the first or second edge comprises a tongue groove 113, 128. The locking system 50a is configured such that the locking tongue is received in the tongue groove of the second edge by means of a folding displacement F displacement of the panel 1 or the adjacent panel 2, for vertical locking of first edge and the second edge.

In all embodiments, a locking angle LA is formed between the first locking surface 115 and the back surface 16 of the panel 1. This is illustrated for instance in FIG. 4. The locking angle LA is measured as the smaller angle in a clockwise direction from the plane of the first locking surface 115 to the lower surface 16 of the panel 1, the locking angle LA being in the range of 40 to 60 degrees, preferably 45 to 55 degrees, more preferably 48 to 52 degrees, such as 50 degrees.

The locking angle LA may be adapted to allow said folding displacement F without abutment of the first locking surface 115 and the second locking surface 125.

In one embodiment, the locking angle LA is adapted to allow assembling by means of said folding displacement F without flexing or compression of the locking strip 116.

The locking angle LA may be adapted to allow assembling by means of said folding displacement without flexing or compression of the locking element 114.

In one embodiment, the locking angle LA is configured such that it is sufficiently low to allow assembling by means of a folding displacement F without overlapping of the second pair of horizontal locking surfaces 125, 115 while the first pair of horizontal locking surfaces 111, 121 are simultaneously in contact.

In the embodiment of FIG. 5 and FIG. 6, the locking strip 116, 146 is formed at least partially in the lower rigid layer 7a. For example, a horizontally extending portion of the locking strip 116, 146 may comprise a portion of the core 3 and a portion of the lower rigid layer 7a. This configuration may bring about the advantage that if the locking strip 116, 146 is bent of flexed to the extent that a mineral-based portion of the locking strip, such as the portion constituted by the core 3, is broken as a consequence thereof, then the portion constituted by the flexible rigid layer will facilitate that the function of the locking strip and the locking element 114, 144 is maintained. Thus, by forming at least part of the locking system 50a, 50b in a rigid layer 5a, 7a, a stronger locking system may be facilitated.

The mechanical locking systems 50a, 50b may be formed by means of cutting tools, such as rotating cutting tools.

It has been contemplated that the locking strip 116, 146 is formed in the lower rigid layer 7a and the locking element 114 is formed in the lower rigid layer 7a as an integral part of the locking strip 116.

The thickness of one rigid layer may be 5-30% of the total panel thickness, preferably 5-15%.

Generally, all terms used in the claims and in the items in the embodiment section below are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

Items

ITEM 1. A building panel 1, such as floor panel, comprising a core 3, the panel further comprising an upper arrangement 5 being attached to an upper side 3b of the core and/or a lower arrangement 7 being attached to an lower side 3a of the core, wherein at least one of the core, the upper arrangement or the lower arrangement comprises a mineral-based layer 5b, 7b, and wherein at least one of upper and/or lower arrangement comprises at least one rigid layer 5a, 7a, wherein said rigid layer comprises at least one of an impact modifier or an acrylic processing aid.

ITEM 2. The building panel according to item 1, wherein said rigid layer is a non-plasticized layer and/or is essentially free from plasticizer.

ITEM 3. The building panel according to item 1 or 2, wherein the impact modifier and acrylic processing aid, combined, is present in an amount of 0.5 to 10 wt %, preferably 2 to 5 wt % of the rigid layer.

ITEM 4. The building panel according to any one of the preceding items 1 to 3, wherein said impact modifier comprises Chlorinated Polyethylene (CPE), Acrylic copolymer (ACR), Methylmethacrylate-butadiene-styrene copolymer (MBS), Acrylonitrile-butadiene-styrene copolymer (ABS), Ethylene/vinyl acetate/carbon monoxide (E/VA/CO) or combinations thereof.

ITEM 5. The building panel according to any one of the preceding items 1 to 4, wherein the amount of impact modifier is in the range of 0.5 to 10 wt %, preferably 2 to 5 wt % of the rigid layer.

ITEM 6. The building panel according to any one of the preceding items 1 to 5, wherein said acrylic processing aid comprises Acrylic copolymers (ACR).

ITEM 7. The building panel according to the preceding item 6, wherein the amount of ACR is in the range of 0.5 to 10 wt %, preferably 2 to 5 wt % of the rigid layer.

ITEM 8. The building panel according to any one of the preceding items 1 to 7, wherein the rigid layer comprises one or more of a thermoplastic polymer, such as PVC.

ITEM 9. The building panel according to any one of the preceding items 1 to 8, wherein the thermoplastic polymer present in an amount of 15-60 wt %, preferably 17-30 wt %.

ITEM 10. The building panel according to any one of the preceding items 1 to 9, wherein the rigid layer further comprises one or more of a filler, such as CaCO3, a pigment, such as carbon black, a stabilizer such as CaZn and a lubricant.

ITEM 11. The building panel according to any one of the preceding items 1 to 10, wherein said upper- and/or lower arrangement (5, 7) comprises a mineral-based attachment layer 5b, 7b, wherein said rigid layer 5a, 7a is directly or indirectly attached to said mineral-based attachment layer, for example by means of adhesive.

ITEM 12. The building panel according to any one of the preceding items 1 to 11, wherein the core 3 is mineral-based, preferably said rigid layer 5a, 7a is attached to the core.

ITEM 13. The building panel according to any one of the preceding items 1 to 12, wherein the mineral-based attachment layer 5b, 7b and/or core 3 comprises MgO.

ITEM 14. The building panel according to any one of the preceding items 1 to 13, wherein the panel further comprises a mechanical locking system 50a, 50b.

ITEM 15. The building panel according to any one of the preceding items 1 to 14, wherein the first and/or mechanical locking system 50a, 50b is formed at least partially in at least one of the rigid layers 5a, 7a, such as the lower rigid layer 5a.

The invention claimed is:

1. A floor panel comprising a core, the floor panel further comprising an upper arrangement being attached to an upper side of the core and/or a lower arrangement being attached to a lower side of the core, wherein the core is mineral-based, wherein the mineral-based core comprises at least 20 wt % of a mineral material, and wherein at least one of the upper arrangement or the lower arrangement comprises at least one rigid layer, wherein said rigid layer comprises at least a thermoplastic polymer and at least one of an impact modifier or an acrylic processing aid, wherein said at least one of the upper arrangement or the lower arrangement comprising at least one rigid layer further comprises a mineral-based attachment layer between the rigid layer and the core, wherein said rigid layer is directly or indirectly attached to said mineral-based attachment layer, and wherein the thermoplastic polymer is present in an amount of 15-60 wt %.

2. The floor panel according to claim 1, wherein said rigid layer is a non-plasticized layer and/or is essentially free from plasticizer.

3. The floor panel according to claim 1, wherein the impact modifier and acrylic processing aid, combined, is present in an amount of 0.5 to 10 wt % of the rigid layer.

4. The floor panel according to claim 1, wherein the rigid layer comprises the impact modifier, said impact modifier comprises Chlorinated Polyethylene (CPE), Acrylic copolymer (ACR), Methylmethacrylate-butadiene-styrene copolymer (MBS), Acrylonitrile-butadiene-styrene copolymer (ABS), Ethylene/vinyl acetate/carbon monoxide (E/VA/CO) or combinations thereof.

5. The floor panel according to claim 1, wherein the rigid layer comprises the impact modifier, the amount of impact modifier is in the range of 0.5 to 10 wt % of the rigid layer.

6. The floor panel according to claim 1, wherein the rigid layer comprises the acrylic processing aid, said acrylic processing aid comprises Acrylic copolymers (ACR).

7. The floor panel according to the preceding claim 6, wherein the amount of ACR is in the range of 0.5 to 10 wt % of the rigid layer.

8. The floor panel according to claim 1, wherein the thermoplastic polymer of the rigid layer is PVC.

9. The floor panel according to claim 1, wherein the rigid layer further comprises one or more of a filler, a pigment, a stabilizer, and a lubricant.

10. The floor panel according to claim 1, wherein said rigid layer is glued to the core.

11. The floor panel according to claim 1, wherein the mineral-based core comprises MgO.

12. The floor panel according to claim 1, wherein the mineral-based attachment layer comprises MgO.

13. The floor panel according to claim 1, further comprising a mechanical locking system.

14. The floor panel according to claim 13, wherein the mechanical locking system is formed at least partially in at least one of the rigid layers.

15. The floor panel according to claim 1, wherein the mineral-based attachment layer comprises at least 20 wt % of a mineral material.

16. A floor panel comprising a core, the floor panel further comprising an upper arrangement being attached to an upper side of the core and/or a lower arrangement being attached to a lower side of the core, wherein the core is mineral-based, wherein the mineral-based core comprises at least 20 wt % of a mineral material, and wherein at least one of the upper arrangement or the lower arrangement comprises at least one rigid layer, wherein said rigid layer comprises at least a thermoplastic polymer and at least one of an impact modifier or an acrylic processing aid, wherein said at least one of the upper arrangement or the lower arrangement comprising at least one rigid layer further comprises a mineral-based attachment layer between the rigid layer and the core, wherein said rigid layer is indirectly attached to said mineral-based attachment layer, by adhesive disposed between the rigid layer and the mineral-based attachment layer, and wherein the thermoplastic polymer is present in an amount of 15-60 wt %.

17. The floor panel according to claim 16, wherein said rigid layer is a non-plasticized layer and/or is essentially free from plasticizer.

18. The floor panel according to claim 16, wherein the impact modifier and acrylic processing aid, combined, is present in an amount of 0.5 to 10 wt % of the rigid layer.

19. The floor panel according to claim 16, wherein the thermoplastic polymer of the rigid layer is PVC.

20. The building panel according to claim 16, wherein the mineral-based attachment layer comprises at least 20 wt % of a mineral material.

* * * * *

UNITED STATES PATENT AND TRADEMARK OFFICE
CERTIFICATE OF CORRECTION

| | | |
|---|---|---|
| PATENT NO. | : 12,421,740 B2 | Page 1 of 1 |
| APPLICATION NO. | : 17/480592 | |
| DATED | : September 23, 2025 | |
| INVENTOR(S) | : Christoffer Nilsson | |

It is certified that error appears in the above-identified patent and that said Letters Patent is hereby corrected as shown below:

In the Claims

Column 11, Line 33, Claim 7:
"the preceding claim 6"
Should read:
-- claim 6 --

Column 12, Line 41, Claim 20:
"The building panel"
Should read:
-- The floor panel --

Signed and Sealed this
Twenty-first Day of October, 2025

John A. Squires
*Director of the United States Patent and Trademark Office*